United States Patent
Windh

(10) Patent No.: US 9,047,544 B2
(45) Date of Patent: Jun. 2, 2015

(54) SYSTEM AND METHOD FOR MOBILE TAGS WITH DYNAMIC CONTENT

(75) Inventor: Rikard Windh, Lund (SE)

(73) Assignee: Scantags AB, Lund (SE)

( * ) Notice: Subject to any disclaimer, the term of this patent is extended or adjusted under 35 U.S.C. 154(b) by 0 days.

(21) Appl. No.: 14/238,863

(22) PCT Filed: Aug. 7, 2012

(86) PCT No.: PCT/SE2012/050862
§ 371 (c)(1),
(2), (4) Date: Apr. 8, 2014

(87) PCT Pub. No.: WO2013/025161
PCT Pub. Date: Feb. 21, 2013

(65) Prior Publication Data
US 2014/0209679 A1    Jul. 31, 2014

(30) Foreign Application Priority Data
Aug. 15, 2011    (SE) ...................................... 1150743

(51) Int. Cl.
G06K 7/00 (2006.01)
G06K 19/04 (2006.01)
G06K 19/00 (2006.01)
G06K 19/06 (2006.01)
G06K 19/077 (2006.01)

(52) U.S. Cl.
CPC .............. *G06K 19/041* (2013.01); *G06K 19/00* (2013.01); *G06K 7/00* (2013.01); *G06K 19/06046* (2013.01); *G06K 19/07749* (2013.01)

(58) Field of Classification Search
CPC ................ G06K 19/00; G06K 19/041; G06K 19/06046; G06K 19/07749; G06K 7/00
USPC .............................. 235/462.15, 435, 492, 494
See application file for complete search history.

(56) References Cited

U.S. PATENT DOCUMENTS

| | | | |
|---|---|---|---|
| 7,502,133 B2 * | 3/2009 | Fukunaga et al. | 358/1.15 |
| 2004/0083373 A1 | 4/2004 | Perkins et al. | |
| 2004/0199778 A1 | 10/2004 | Wernet et al. | |
| 2009/0078772 A1 * | 3/2009 | Ofek et al. | 235/462.04 |
| 2009/0154759 A1 | 6/2009 | Koskinen et al. | |
| 2010/0314276 A1 * | 12/2010 | Wilen | 206/459.5 |

FOREIGN PATENT DOCUMENTS

| | | |
|---|---|---|
| GB | 2467113 A | 7/2010 |
| JP | 2006195935 | 7/2006 |
| JP | 2009282896 | 12/2009 |
| WO | 2006035315 A1 | 4/2006 |

* cited by examiner

*Primary Examiner* — Seung Lee
(74) *Attorney, Agent, or Firm* — Capitol City TechLaw

(57) ABSTRACT

The present invention relates to a method, system, and computer-readable medium for producing a mobile tag with dynamic content. Furthermore, the present invention provides a mobile tag with dynamic content in the form of a sticker.

27 Claims, 3 Drawing Sheets

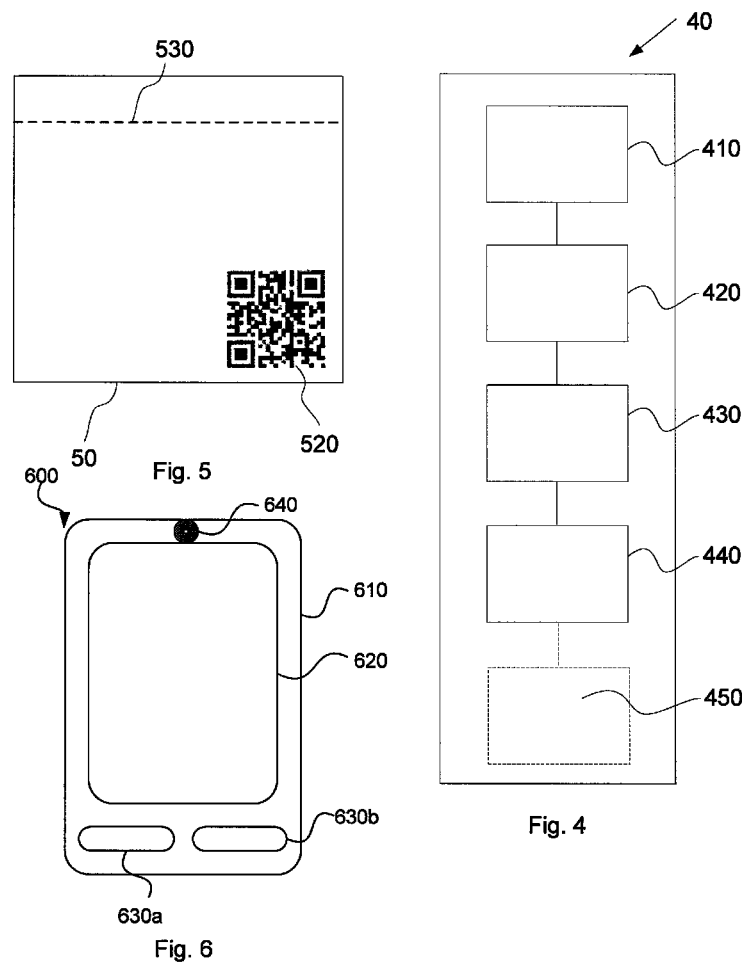

SYSTEM AND METHOD FOR MOBILE TAGS WITH DYNAMIC CONTENT

FIELD OF THE INVENTION

This invention pertains in general to the field of mobile communication. More particularly the invention relates to mobile tags and more particularly to mobile tags with dynamic content.

BACKGROUND OF THE INVENTION

Within telecommunication, the use data transfer through mobile tags is growing rapidly. Many different mobile tags exists, such as barcodes, QR codes, datamatrix codes or chips based on close range wireless communication, such as Radio Frequency Identification (RFID) or near field communication (NFC).

The mobile tags store information, which may be scanned by a suitable scanning device, such as a camera or mobile phone, after which the information encoded on the tag can be interpreted. If a web link/uniform resource locator (URL) is stored on the tag, and the scanning device has internet access, the device is commonly configured to start a web browser and show the content of the web page in relation to the web link/URL. Thus, a mobile tag may enhance information content of a printed publication, or any other publication comprising the mobile tag.

However, a disadvantage with mobile tags is that they are designed based on specific information, which means that the information content of the mobile tag must be known at the time the mobile tag is produced. If the information of a tag is a web link/URL, the web link/URL cannot be changed once the mobile tag has been produced, or in the case of a close range wireless communication mobile tag, can only be changed with the right equipment, which is often unavailable for an end user of the mobile tag.

Thus, it is difficult to pre-produce mobile tags, before the desired content is decided.

Hence, an improved mobile tag would be advantageous and in particular a system allowing for increased flexibility, cost-effectiveness, and ease of use would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a method, a system, a sticker and a computer-readable medium according to the appended patent claims.

According to a first aspect, a method for producing a mobile tag with dynamic content is provided. The method comprises a first step of randomly generating a unique uniform resource locator (UURL), comprising a static part and a dynamic part, and corresponding personal identification number (PIN); a second step of storing the UURL and the PIN as an entry in a database; a third step of generating mobile tag information comprising the UURL; a fourth step of creating a master document comprising the generated mobile tag information, correlated to the corresponding PIN; and a fifth step of creating singular units from the master document, said singular units comprising a mobile tag, carrying the mobile tag information and the corresponding PIN.

This is advantageous, since it allows mobile tags to be pre-produced, before the desired content is decided.

The method may further comprise a step of generating a PIN unlock key (PUK), corresponding to the UURL and the PIN.

This is advantageous, since it increases security, flexibility and user friendliness.

The mobile tag may be a two-dimensional matrix code image, such as in the format 3-DI, ArrayTag, Aztec Code, Chromatic Alphabet, Codablock, Code 1, Code 16K, Code 49, ColorCode, Compact Matrix Code, CP Code, Cyber-Code, DataGlyphs, Datamatrix, Data Matrix ECC200, Datastrip Code, Dot Code A, d-touch, EZcode, Grid Matrix Code, High Capacity Color Barcode, HueCode, INTACTA.CODE, InterCode, JAGTAG, MaxiCode, mCode, MicroPDF, MiniCode, MMCC, Optar, PaperDisk, PDF417, PDMark, QR Code, QuickMark Code, ShotCode, Small Aztec Code, SmartCode, Snowflake Code, SPARQCode, SuperCode, Trillcode, UltraCode, UnisCode, WaterCode, VeriCode or VSCode.

This is advantageous, since it may be easy to create and use.

The mobile tag may be a close range wireless communication based chip, such as a Radio Frequency Identification (RFID) chip, a near field communication (NFC) chip, an IEEE standard 1902.1 (RuBee) chip or an IEEE standard 802.15.1 (Bluetooth) chip.

This is advantageous, since it may improve user-friendliness.

The master document may comprise identifiers, such as cutting lines, for identifying individual mobile tags.

This is advantageous, since it may make production easier.

According to a second aspect, a system for a mobile tag with dynamic content is provided. Said system comprises a mobile tag, a server and a database, the mobile tag pointing towards the server by means of a UURL, the server being operably connected to the database as well as internet, wherein the server is configured to access the database and send information stored in relation to the UURL to a user, when the user captures the mobile tag with any kind of suitable capturing device, configured to access internet.

According to a third aspect, a sticker is provided, comprising a mobile tag and a PIN code, unique for the mobile tag.

According to another aspect, a note is provided, comprising a mobile tag. In one embodiment the note further comprises a PIN unique for the mobile tag.

According to a fourth aspect, a computer readable medium is provided, having embodied thereon a computer program for processing by a computer, the computer program comprising a first code segment for randomly generating a unique uniform resource locator (UURL), comprising a static part and a dynamic part, and corresponding personal identification number (PIN); a second code segment for storing the UURL and the PIN as an entry in a database; a third code segment for generating mobile tag information comprising the UURL; a fourth code segment for creating a master document where the generated mobile tag information is correlated to the corresponding PIN; and optionally a fifth code segment for creating singular units, from the master document, said singular units comprising a mobile tag, carrying the mobile tag information and the corresponding PIN.

According to a fifth aspect a two dimensional code for a mobile tag with dynamic content is provided being provided through a first step of randomly generating a unique uniform resource locator (UURL), comprising a static part and a dynamic part, and corresponding personal identification number (PIN), a second step of storing the UURL and the PIN as an entry in a database, a third step of generating mobile tag information comprising the UURL, a fourth step of creating a master document comprising the generated mobile tag information, correlated to the corresponding PIN; and a fifth step of creating singular units from the master document, said singular units comprising a mobile tag, carrying the mobile tag information and the corresponding PIN.

According to other aspects, a sticker, a note, a method and a system is provided according to above, wherein the master document and the singular unit does not include or carry the PIN, and wherein the PIN is provided to the end user in another manner, such as through electronic communication.

According to a sixth aspect an apparatus for capturing a two dimensional code according to above is provided.

According to other aspects an apparatus capable of capturing a mobile tag according to above is provided and a two dimensional code for a mobile tag with dynamic content being generated according to above is also provided. In one embodiment the apparatus is a mobile phone.

The present invention provides the advantage over the prior art that it allows mobile tags to be pre-produced, before the desired content is decided

BRIEF DESCRIPTION OF THE DRAWINGS

These and other aspects, features and advantages of which the invention is capable, will be apparent and elucidated from the following description of embodiments of the present invention, reference being made to the accompanying drawings, in which

FIG. 2 is an illustration showing a sticker according to two embodiments, where

FIG. 4 is a computer-readable medium according to an embodiment;

FIG. 5 is an illustration showing a singular unit according to an embodiment; and FIG. 6 is an illustration of a mobile phone arranged according to an embodiment.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

Figure 1:
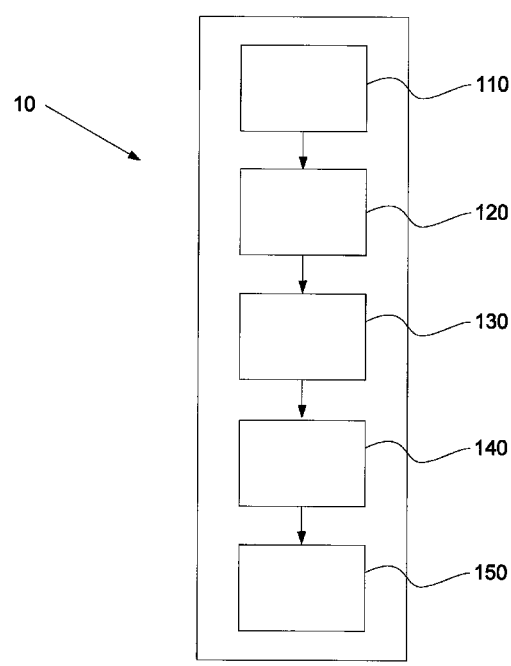
FIG. 1 is a flowchart showing a method according to an embodiment.

In an embodiment of the invention according to FIG. 1, a method 10 for producing a mobile tag with dynamic content is disclosed.

The method 10 comprises a first step 110 of randomly generating a unique uniform resource locator (UURL) and corresponding personal identification number (PIN). In an embodiment, in addition to the PIN, a corresponding PIN unlock key (PUK) is also randomly generated.

The UURL may comprise a static part, such as a domain name which is static for several UURL addresses, and a variable part, such as a unique combination of characters. In an embodiment the UURL is in the form http://DOMAIN/VAR, where DOMAIN is the domain name of a server and VAR is the variable part. In another embodiment, the UURL is in the form http://VAR.DOMAIN. In a specific embodiment, the domain is http://scntgs.com/?234234; http://234234.scntgs.com; or http://scntgs.com/234234.

The method 10 further comprises a step 120 of storing the information, randomly generated in the first step, in a database. The database may be any kind of suitable database, known to a person skilled in the art, such as a list stored in a memory. The memory may be any memory capable of storing information, such as a conventional hard drive, Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

Next, the method 10 comprises a step 130 of generating mobile tag information comprising the UURL. The mobile tag information may then be suitably transformed into a mobile tag, by methods well known to a person skilled in the art.

In an embodiment, the mobile tag information may be transformed into a two-dimensional matrix code image, such as selected from the group consisting of: 3-DI, ArrayTag, Aztec Code, Chromatic Alphabet, Codablock, Code 1, Code 16K, Code 49, ColorCode, Compact Matrix Code, CP Code, CyberCode, DataGlyphs, Datamatrix, Data Matrix ECC200, Datastrip Code, Dot Code A, d-touch, EZcode, Grid Matrix Code, High Capacity Color Barcode, HueCode, INTACTA.CODE, InterCode, JAGTAG, MaxiCode, mCode, MicroPDF, MiniCode, MMCC, Optar, PaperDisk, PDF417, PDMark, QR Code, QuickMark Code, ShotCode, Small Aztec Code, SmartCode, Snowflake Code, SPARQCode, SuperCode, Trillcode, UltraCode, UnisCode, WaterCode, VeriCode, VSCode.

In an embodiment, the mobile tag information may be conveyed to a close range wireless communication based chip. A non exclusive list of examples of close range wireless communication based chips are Radio Frequency Identification (RFID), near field communication (NFC), IEEE standard 1902.1 (RuBee) and IEEE standard 802.15.1 (Bluetooth). In one specific embodiment, the close range wireless communication based chip is a NFC chip. The mobile tag is generated by programming the chip with the UURL, according to methods well known to a person skilled in the art.

The method 10 further comprises a step 140 of creating a master document where the generated mobile tag information is correlated to, such as disclosed in relation to or in proximity to, the corresponding PIN and optionally the corresponding PUK.

The master document may be a digital document of any suitable format as known to a person skilled in the art, such as portable document format files, Adobe Illustrator files, and Microsoft Word or Excel files.

The master document may be printed into a physical document, by methods known to a person skilled in the art.

In an embodiment, the master document is provided with identifiers, such as lines (not shown), for identifying individual mobile tags. If the master document is printed as a physical document, the identifying tags may be cut lines, used to indicate where individual mobile tags, or desired groups of individual mobile tags are to be cut.

Figures 2A, 2B:
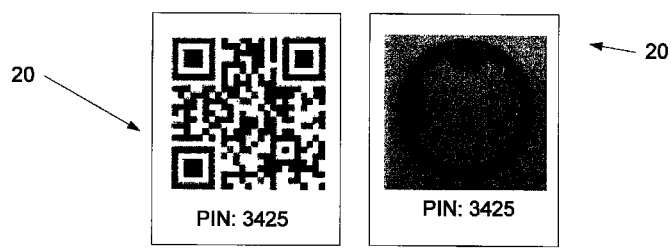
FIG. 2A shows a sticker with a QR Code and FIG. 2B shows a sticker with a NFC chip.

Next, the method 10 comprises a step of creating 150 singular units from the master document, said singular units comprising a mobile tag, carrying the mobile tag information and the corresponding PIN. As stated above, the mobile tag may be produced by converting the mobile tag information into the desired mobile tag format, by methods well known to a person skilled in the art. Singular units of mobile tags, or groups of singular units of mobile tags, may be produced by dividing, such as cutting, the master document into units of one mobile tag and the corresponding PIN and optionally the corresponding PUK. In an embodiment, the singular unit is a sticker 20 according to FIG. 2A or 2B. FIG. 2A shows a sticker 20 with a QR Code and FIG. 2B shows a sticker with a NFC chip.

FIG. 5 is an illustration showing a singular unit according to an embodiment. In this embodiment the singular unit is a repositionable note 50 also called a repositional notes, which is a piece of stationery with a re-adherable strip of adhesive 530 on the back (indicated by a dashed line), designed for temporarily attaching notes 50 to documents and other surfaces. In the embodiment of FIG. 5 the note 50 is arranged with a QR-code 520. Such a note can thus be used easily to provide another user with complex or space consuming information (for example, a video, an image or an audio file) in a simple manner.

The method allows production of pre-produced mobile tags, before the desired content is decided, which is advantageous.

Figure 3:
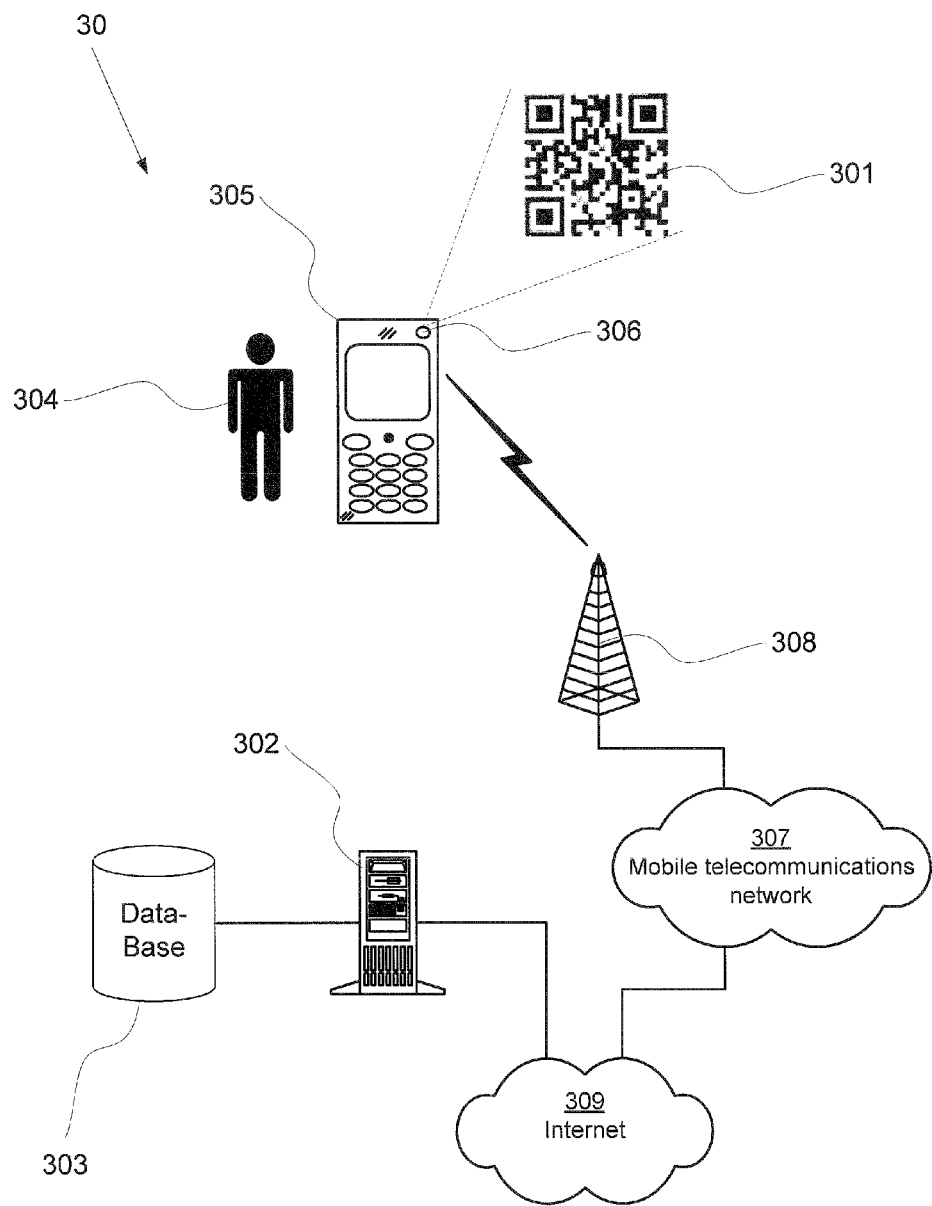
FIG. 3 is a schematic illustration of a system according to an embodiment.

A further embodiment of the invention is illustrated in FIG. 3, which is a schematic representation of a system 30 for use of mobile tags with dynamic content, such as mobile tags produced according the method according to embodiments of the invention.

The UURL of a mobile tag 301 points towards a server 302 connected to the database 303. A user 304 may capture the mobile tag 301 with any kind of suitable capturing device, such as a mobile phone 305 with an integrated camera 306. The mobile phone 305 is configured to access a mobile telecommunications network 307 via a telecommunications base station/tower/mast 308. The mobile telecommunications network 307 is connected to internet 309, as is the server 302. When the user 304 captures the mobile tag 301, the UURL directs the user 304 to the server 302.

If the UURL is accessed for the first time, the server 302 is configured to prompt the user 304 with the option to enter information, such as a message, an email address, contact details or a URL of choice. The server 302 is further configured to store the information entered by the user 304 in the database 303, in connection with the UURL. The user may also protect the information entered, by turning on PIN protection. Subsequent editing of the information will then only be possible if the user enters the correct PIN, i.e. the PIN related to the specific mobile tag.

In an embodiment, if the UURL is accessed for the first time, the server 302 may be configured to prompt the user 304 and request the PIN code, corresponding to the specific UURL which is currently accessed. The database 303, connected to the server 302 comprises information of all UURL:s and their corresponding PIN:s. If the user 304 enters the correct PIN, i.e. the PIN corresponding to the UURL, the server is configured to prompt the user 304 with the option to enter information, such as a message, an email address, contact details or a URL of choice. The server 302 is further configured to store the information entered by the user 304 in the database 303, in connection with the UURL.

In an embodiment, the user 304 accessing the UURL for the first time may also be prompted with the alternative to turn off PIN protection. If this is done, any subsequent user may alter information in the database 303, correlating to the specific UURL in question.

If the UURL is accessed subsequently, the server 302 is configured to access the database 303 and send the information stored in the database 303, in relation to the UURL, to the user 304 for subsequent display by e.g. the mobile phone 305. If the information is a URL of choice, the server 302 may be configured to automatically redirect the user to the URL of choice.

Thus, the system allows alteration of a pre-produced mobile tag, before the desired content is decided, which is advantageous.

The server 302 unit may be any unit normally used for performing the involved tasks, e.g. a hardware, such as a processor with a memory. The processor may be any of a variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

The invention may be implemented in any suitable form including hardware, software, firmware or any combination of these. However, preferably, the method aspect of the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

In an embodiment according to FIG. 4, a computer-readable medium 40 is disclosed, having embodied thereon a computer program for processing by a computer, the computer program comprising a first code segment 410 for randomly generating unique uniform resource locator (UURL), comprising a static part and a dynamic part, and corresponding personal identification number (PIN). The computer program further comprises a second code segment 420 for storing the UURL and the PIN as an entry in a database and a third code segment 430 for generating a mobile tag comprising the UURL. The computer program also comprises a fourth code segment 440 for creating a master document where the generated mobile tags are disclosed in proximity to the corresponding PIN. Optionally, the computer-readable medium 40 may also comprise a fifth code segment 450 for creating singular units, from the master document, said singular units comprising a mobile tag, carrying the mobile tag information and the corresponding PIN. The fifth code segment 450 is not necessary, provided that the master document is a physical document, but might enhance automation, provided that the master document is a digital document.

As can be seen in FIG. 5 the singular unit may be arranged to not carry the PIN code. In such an embodiment the PIN is transferred to the user in other manners, for example by a text message or other digital communication.

For singular units that do not carry the PIN code, the fourth step of FIG. 4 includes creating a master document that does not carry information on the correlated PIN and the fifth step of FIG. 4 includes creating singular units that does not carry the PIN code.

This allows for production of singular units for which it is impractical to distribute a PIN carried on each single unit. For the example of the repositionable note 50, as a note pad carries a great number of notes and are often sold in batches, the assignment and distribution of PIN codes would be cumbersome.

Using the manner disclosed above allows for production of singular units that can be filled with content, write-protected and distributed to end-users without having a separate document carrying the PIN.

Furthermore, this allows for production of single units without PIN when the usage of the units doesn't require write-protection possibilities.

FIG. 6 shows a schematic overview of a mobile communications terminal 600 adapted according to the teachings herein. In the embodiment shown the mobile communications terminal is a mobile phone 600. In other embodiments the mobile communications terminal 600 is a personal digital assistant, a media player, a location finding device or any hand-held device capable of communicating with other devices. The mobile phone 600 comprises a housing 610 in which a display 620 is arranged. In one embodiment the display 620 is a touch display. In other embodiments the display 620 is a non-touch display. Furthermore, the mobile phone 600 comprises two keys 630a, 630b. In this embodiment there are two keys 630, but any number of keys, including none, is possible and depends on the design of the mobile phone 600. In one embodiment the mobile phone 600 is configured to display and operate a virtual key on the touch display 620. It should be noted that the number of virtual keys are dependent on the design of the mobile phone 600 and an application that is executed on the mobile phone. In one embodiment the communications terminal 600 comprises an ITU-T keypad or a QWERTY (or equivalent) keypad in addition to or as an alternative to a touch-sensitive display. In an embodiment where the keypad is an alternative to a touch-sensitive display, the display 620 is a non-touch-sensitive display.

The mobile phone 600 further comprise a device for capturing a mobile tag as disclosed above. In the example of FIG. 6 the device is a camera 640 which is configured to capture a two dimensional code and have the two dimensional code decoded by a controller (not shown) of the mobile phone 600.

In another embodiment (not shown) the mobile phone 600 comprises a RFID reader configured to capture the information provided by an RFID chip implementing the mobile tag and have the information decoded/processed by the controller of the mobile phone 600.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for producing a mobile tag with dynamic content, the method comprising:
    randomly generating a unique uniform resource locator (UURL), including a static part and a dynamic part, and a corresponding personal identification number (PIN);
    storing the UURL and the PIN as an entry in a database;
    generating mobile tag information including the UURL; and
    creating a master document including the mobile tag information, correlated to the corresponding PIN.

2. The method according to claim 1, further comprising creating singular units from the master document, the singular units including a mobile tag, carrying the mobile tag information and a corresponding PIN.

3. The method according to claim 1, further comprising randomly generating a PIN unlock key (PUK), corresponding to the UURL and the PIN.

4. The method according to claim 1, wherein the mobile tag is a two-dimensional matrix code image.

5. The method according to claim 4, wherein the two-dimensional matrix code image is in the format 3-DI, Array-Tag, Aztec Code, Chromatic Alphabet, Codablock, Code 1, Code 16K, Code 49, ColorCode, Compact Matrix Code, CP Code, CyberCode, DataGlyphs, Datamatrix, Data Matrix ECC200, Datastrip Code, Dot Code A, d-touch, EZcode, Grid Matrix Code, High Capacity Color Barcode, HueCode, INTACTA.CODE, InterCode, JAGTAG, MaxiCode, mCode, MicroPDF, MiniCode, MMCC, Optar, PaperDisk, PDF417, PDMark, QR Code, QuickMark Code, ShotCode, Small Aztec Code, SmartCode, Snowflake Code, SPARQCode, SuperCode, Trillcode, UltraCode, UnisCode, WaterCode, VeriCode or VSCode.

6. The method according to claim 4, wherein the two-dimensional matrix code image is in the format QR Code.

7. The method according to claim 1, wherein the mobile tag is a close range wireless communication based chip.

8. The method according to claim 7, wherein the close range wireless communication based chip is a Radio Frequency Identification (RFID) chip, a near field communication (NFC) chip, an IEEE standard 1902.1 (RuBee) chip or an IEEE standard 802.15.1 (Bluetooth) chip.

9. The method according to claim 1, wherein the master document comprises identifiers for identifying individual mobile tags.

10. A system for a mobile tag with dynamic content, the system comprising:
    a mobile tag;
    a server; and
    a database;
    wherein the mobile tag points towards the server via a unique uniform resource locator (UURL);
    wherein the server is operably connected to the database and internet;
    wherein the server is configured to access the database and send information stored in relation to the UURL to a user, when the user captures the mobile tag with a capturing device, configured to access internet; and
    wherein the mobile tag is a close range wireless communication based chip.

11. The system according to claim 10, wherein the close range wireless communication based chip is a Radio Frequency Identification (RFID) chip, a near field communication (NFC) chip, an IEEE standard 1902.1 (RuBee) chip or an IEEE standard 802.15.1 (Bluetooth) chip.

12. A non-transitory computer-readable medium having embodied thereon a computer program for processing by a computer, the computer program comprising:
a first code segment for randomly generating a unique uniform resource locator (UURL), including a static part and a dynamic part, and a corresponding personal identification number (PIN);
a second code segment for storing the UURL and the PIN as an entry in a database;
a third code segment for generating mobile tag information including the UURL; and
a fourth code segment for creating a master document where the mobile tag information is correlated to the corresponding PIN.

13. A mobile tag with dynamic content being provided through a method comprising:
randomly generating a unique uniform resource locator (UURL), including a static part and a dynamic part, and a corresponding personal identification number (PIN);
storing the UURL and the PIN as an entry in a database;
generating mobile tag information including the UURL; and
creating a master document including the mobile tag information, correlated to the corresponding PIN.

14. A method for producing a mobile tag with dynamic content, the method comprising:
randomly generating a unique uniform resource locator (UURL), including a static part and a dynamic part, and a corresponding personal identification number (PIN);
storing the UURL and the PIN as an entry in a database;
generating mobile tag information including the UURL; and
creating a master document including the mobile tag information.

15. The method according to claim 14, further comprising creating singular units from the master document, the singular units including a mobile tag, carrying the mobile tag information.

16. The method according to claim 14, further comprising randomly generating a PIN unlock key (PUK), corresponding to the UURL and the PIN.

17. A non-transitory computer-readable medium having embodied thereon a computer program for processing by a computer, the computer program comprising:
a first code segment for randomly generating a unique uniform resource locator (UURL), including a static part and a dynamic part, and a corresponding personal identification number (PIN);
a second code segment for storing the UURL and the PIN as an entry in a database;
a third code segment for generating mobile tag information including the UURL; and
a fourth code segment for creating a master document.

18. A mobile tag with dynamic content being provided through a method comprising:
randomly generating a unique uniform resource locator (UURL), including a static part and a dynamic part, and a corresponding personal identification number (PIN);
storing the UURL and the PIN as an entry in a database;
generating mobile tag information including the UURL; and
creating a master document including the mobile tag information.

19. A system for a mobile tag with dynamic content, the system comprising:
a mobile tag with dynamic content being provided through a method involving
randomly generating a unique uniform resource locator (UURL), including a static part and a dynamic part, and a corresponding personal identification number (PIN);
storing the UURL and the PIN as an entry in a database;
generating mobile tag information including the UURL; and
creating a master document including the mobile tag information;
a server; and
a database;
wherein the mobile tag points towards the server via a unique uniform resource locator (UURL);
wherein the server is operably connected to the database and internet; and
wherein the server is configured to access the database and send information stored in relation to the UURL to a user, when the user captures the mobile tag with a capturing device, configured to access internet.

20. The system according to claim 19, wherein the mobile tag is a two-dimensional matrix code image.

21. The system according to claim 20, wherein the two-dimensional matrix code image is in the format 3-DI, ArrayTag, Aztec Code, Chromatic Alphabet, Codablock, Code 1, Code 16K, Code 49, ColorCode, Compact Matrix Code, CP Code, CyberCode, DataGlyphs, Datamatrix, Data Matrix ECC200, Datastrip Code, Dot Code A, d-touch, EZcode, Grid Matrix Code, High Capacity Color Barcode, HueCode, INTACTA.CODE, InterCode, JAGTAG, MaxiCode, mCode, MicroPDF, MiniCode, MMCC, Optar, PaperDisk, PDF417, PDMark, QR Code, QuickMark Code, ShotCode, Small Aztec Code, SmartCode, Snowflake Code, SPARQCode, SuperCode, Trillcode, UltraCode, UnisCode, WaterCode, VeriCode or VSCode.

22. The system according to claim 20, wherein the two-dimensional matrix code image is in the format QR Code.

23. A sticker comprising:
a mobile tag with dynamic content; and
a PIN code, unique to the mobile tag;
wherein the dynamic content is provided through a method involving
randomly generating a unique uniform resource locator (UURL), including a static part and a dynamic part, and a corresponding personal identification number (PIN);
storing the UURL and the PIN as an entry in a database;
generating mobile tag information including the UURL; and
creating a master document including the mobile tag information.

24. The sticker according to claim 23, wherein the mobile tag is a QR Code or a near field communication (NFC) based chip.

25. A sticker comprising a mobile tag with dynamic content being provided through a method involving
randomly generating a unique uniform resource locator (UURL), including a static part and a dynamic part, and a corresponding personal identification number (PIN);
storing the UURL and the PIN as an entry in a database;
generating mobile tag information including the UURL; and creating a master document including the mobile tag information.

26. A note comprising a mobile tag with dynamic content being provided through a method involving
randomly generating a unique uniform resource locator (UURL), including a static art and a dynamic part, and a corresponding personal identification number (PIN);
storing the UURL and the PIN as an entry in a database;
generating mobile tag information including the UURL; and
creating a master document including the mobile tag information.

27. The note according to claim 26, further comprising a PIN unique to the mobile tag.

* * * * *